US012131614B2

(12) United States Patent
Forster

(10) Patent No.: US 12,131,614 B2
(45) Date of Patent: Oct. 29, 2024

(54) CONVERGENCE OF PERFORMANCE OF RFID DEVICES IN AN ELECTRONIC ARTICLE SURVEILLANCE SYSTEM

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 103 days.

(21) Appl. No.: 17/904,915

(22) PCT Filed: Feb. 25, 2021

(86) PCT No.: PCT/US2021/019561
§ 371 (c)(1),
(2) Date: Aug. 24, 2022

(87) PCT Pub. No.: WO2021/173772
PCT Pub. Date: Sep. 2, 2021

(65) Prior Publication Data

US 2023/0079671 A1 Mar. 16, 2023

Related U.S. Application Data

(60) Provisional application No. 62/981,211, filed on Feb. 25, 2020.

(51) Int. Cl.
*G08B 13/24* (2006.01)

(52) U.S. Cl.
CPC ....... *G08B 13/244* (2013.01); *G08B 13/2471* (2013.01)

(58) Field of Classification Search
CPC ............ G08B 13/2448; G08B 13/2485; G08B 13/2402; G06K 19/07749
See application file for complete search history.

(56) References Cited

U.S. PATENT DOCUMENTS

2006/0226982 A1 10/2006 Forster
2006/0273902 A1* 12/2006 Shafer ................ G08B 13/2448 340/572.1

(Continued)

FOREIGN PATENT DOCUMENTS

CN 1791895 6/2006
CN 209767550 U 12/2019

(Continued)

OTHER PUBLICATIONS

International Preliminary Report on Patentability dated Aug. 30, 2022 issued in corresponding IA No. PCT/US2021/019561 filed Feb. 25, 2021.

(Continued)

*Primary Examiner* — Mirza F Alam

(57) ABSTRACT

RFID devices for use in electronic surveillance article ("EAS") systems may be differently configured, resulting in different performance at the operating frequency or range of frequencies of an EAS system. The performance of differently configured RFID devices may be converged or rendered substantially similar by testing the performance of such RFID devices in a range of frequencies. At least one of the RFID devices is reconfigured to converge the performance of the RFID devices in the range of frequencies if the performance of the RFID devices is not sufficiently similar. This may include changing the configuration of an antenna, an RFID chip, and/or a non-functional component of an RFID device and/or the location in which an RFID device is associated to an article. Differently configured RFID devices may all be manufactured from the same initial configuration, with different RFID devices being differently processed before incorporation in an EAS system.

25 Claims, 1 Drawing Sheet

(56) References Cited

U.S. PATENT DOCUMENTS

| | | | | |
|---|---|---|---|---|
| 2007/0194930 | A1 | 8/2007 | Hunt et al. | |
| 2008/0048863 | A1* | 2/2008 | Copeland ........... | G06K 19/0726 340/572.1 |
| 2009/0140860 | A1 | 6/2009 | Forster | |
| 2010/0052865 | A1* | 3/2010 | Eckstein ............ | G08B 13/2448 340/10.4 |
| 2012/0001814 | A1* | 1/2012 | Copeland ............... | H01Q 21/30 343/726 |
| 2012/0044074 | A1* | 2/2012 | Mulla ................ | G08B 13/2448 340/572.1 |
| 2012/0274448 | A1 | 11/2012 | Marcus et al. | |
| 2020/0042754 | A1 | 2/2020 | Trivelpiece et al. | |

FOREIGN PATENT DOCUMENTS

| | | |
|---|---|---|
| EP | 1875408 | 1/2008 |
| JP | 2008-539510 | 11/2008 |
| JP | 2010-086166 | 4/2010 |
| WO | 2004/104958 | 12/2004 |
| WO | 2006/115756 | 11/2006 |
| WO | 2012/148686 | 11/2012 |

OTHER PUBLICATIONS

International Search Report and Written Opinion dated Jun. 16, 2021 issued in corresponding IA.

* cited by examiner

CONVERGENCE OF PERFORMANCE OF RFID DEVICES IN AN ELECTRONIC ARTICLE SURVEILLANCE SYSTEM

CROSS-REFERENCE TO RELATED APPLICATION

The present application is a 371 of International Application No. PCT/US2021/019561, which was published in English on Sep. 2, 2021, and claims the benefit of U.S. Provisional Patent Application No. 62/981,211 filed Feb. 25, 2020, both of which are incorporated herein by reference in their entireties.

FIELD

The present subject matter relates to radio frequency identification ("RFID") devices. More particularly, the present subject matter relates to converging the performance of differently configured RFID devices used in an electronic article surveillance ("EAS") system.

BACKGROUND

In retail stores, an accurate count of the products on display and/or in storage is important. Additionally, it is important to have an effective anti-theft system in place. It is conventional to employ RFID tags and labels (which may be collectively referred to herein as "RFID devices") to perform both of these functions.

An EAS system employing RFID technology typically has two primary read zones, each of which includes an associated RFID reader. One of the read zones is an area in the store where the products are presented to the consumer (which may be referred to herein as "inventory zone"), while the other read zone is an area at the exit of the store where any RFID devices that have not been suitably deactivated may be detected (which may be referred to herein as a "detection zone") to trigger some type of alarm, indicating that an attempt is being made to steal them. When a customer properly purchases an item, the cashier either removes or deactivates the RFID device associated with it. If the RFID device is not removed or deactivated, an RFID reader or readers will read the device and cause an alarm or other alert to trigger in the detection zone.

Although the above-described systems are widespread, there are certain disadvantages. When using RFID devices/systems for an EAS system, one common problem is that the read range of an RFID device in certain circumstances can be large enough that an RFID device in the inventory zone can be read in the detection zone or vice versa. To reduce this risk, a transition zone is frequently provided between the inventory zone and the detection zone to physically separate the two read zones. However, on account of different RFID devices having greater sensitivity at an operating frequency and/or different articles having different effects on the performance of the associated RFID devices, it is necessary for the transition zone to be relatively large. The larger the transition zone, the smaller the inventory zone and thus the less merchandise the retailer can present for purchase. It would, thus, be advantageous to provide a system in which differently configured RFID devices have the same performance at the operating frequency or range of frequencies of an EAS system, thus allowing for the size of the transition zone to be decreased.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Methods for configuring RFID devices for use in an EAS system are described herein. In some embodiments, the method includes (1) providing a plurality differently configured sample RFID devices that are to be tagged to different products monitored by the EAS system; (2) testing the performance of the plurality of differently configured sample RFID devices in a range of frequencies; (3) comparing the performance of the sample RFID devices in the range of frequencies with the performance of a plurality of target RFID devices in the range of frequencies; and (4) reconfiguring at least one or more of the plurality of differently configured sample RFID devices to converge the performance of the one or more sample RFID devices in the range of frequencies, when the performance of the one or more sample RFID devices in the range of frequencies is not sufficiently similar with the performance of complementary target RFID devices in the same range of frequencies. Reconfiguring the at least one or more of the plurality of differently configured sample RFID devices to converge the performance of the one or more sample RFID devices in the range of frequencies can include digitally reconfiguring the device, physically reconfiguring the device, or combinations thereof. Methods for digitally and physically reconfiguring the devices are described in more detail below.

The performance configuration of the plurality of target RFID devices is chosen in a manner such that, after reconfiguration, the performance of each sample RFID device of the plurality of differently configured sample RFID devices is similar even though they may be tagged to different merchandise/products. The one or more sample RFID devices that have been reconfigured are incorporated into the EAS system when the performance of the one or more sample RFID devices is sufficiently similar in the range of frequencies. Similarly, other sample RFID devices of the plurality of RFID devices are tested and compared with the performance of complementary target RFID devices and finally incorporated into the EAS system. When all the sample RFID devices work the same due to convergence of performance, the EAS system becomes more predictable. This helps in optimizing the system for allowing good detection at the detection zone (gates) of the EAS system.

In some embodiments, reconfiguration of the one or more sample RFID devices is achieved by digitally modifying the one or more sample RFID devices. In some embodiments, the digital modifications involve providing each of the one or more sample RFID devices with a unique digital indicator, which is linked to a digital database containing performance configuration information of a plurality of target RFID devices including that of the complementary target RFID devices corresponding to the one or more sample RFID devices. In some embodiments, the unique digital indicator is the same when the one or more sample RFID devices are tagged to set of products of same type. Further, the performance configuration information of the plurality of target RFID devices including the performance of the complementary target RFID devices is determined based on the type of products to which the corresponding plurality of sample RFID devices are tagged.

In some embodiments, reconfiguration of the one or more sample RFID devices in order to converge the performance of the one or more sample RFID devices is achieved by physically modifying the one or more sample RFID devices. In some embodiments, physical modifications include, but are not limited to, changing the configuration of an antenna, changing the size of an antenna, changing the configuration of the antenna including changing the material composition of the antenna etc., and combinations thereof.

In some embodiments, the reconfigured sample RFID devices are incorporated into the EAS system. The EAS system further contains RFID readers configured to read the one or more sample RFID devices, each containing the unique digital indicator, based on performance configuration information corresponding to the one or more sample RFID devices accessed from the digital database. This allows the EAS system including the RFID readers at the detection zone to digitally consider the behavior of all sample RFID devices, allowing the readers at the detection zone to sound an alarm if any product is being stolen. At the same time, it is ensured that there are no false alarms due to over reading.

In some embodiments, a method for manufacturing RFID devices for use in an EAS system is also described herein. The method includes providing a plurality of sample RFID devices having an identical initial configuration, reconfiguring one sample RFID device of the plurality of sample RFID devices to have a first final configuration, and reconfiguring another sample RFID device of the plurality of sample RFID devices to have a second final configuration when performance of the one or more sample RFID devices is different from that of performance of complementary target RFID devices and/or different from performance of one another. The sample RFID devices having the first and second final configurations are then incorporated into an electronic article surveillance (EAS) system, with the first final configuration being different from the second final configuration. The sample RFID devices having the first and second final configurations have sufficiently similar performance at a frequency or in a range of frequencies employed in the EAS system.

DETAILED DESCRIPTION

Detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

RFID devices of different sizes, materials, and/or construction can have a different combination of parameters such that, if an EAS system is optimized to reduce the transition zone size for one RFID device, it may not be effective for a differently configured RFID device. Even if it were practicable to render all of the RFID devices used in an EAS system identical, differently configured piece of merchandise will differently affect the performance of associated RFID devices. Thus, a wide variety of factors must be considered when attempting to reduce the size of the transition zone of an EAS system accommodating differently configured RFID devices and differently configured articles of merchandise.

Figure 1:
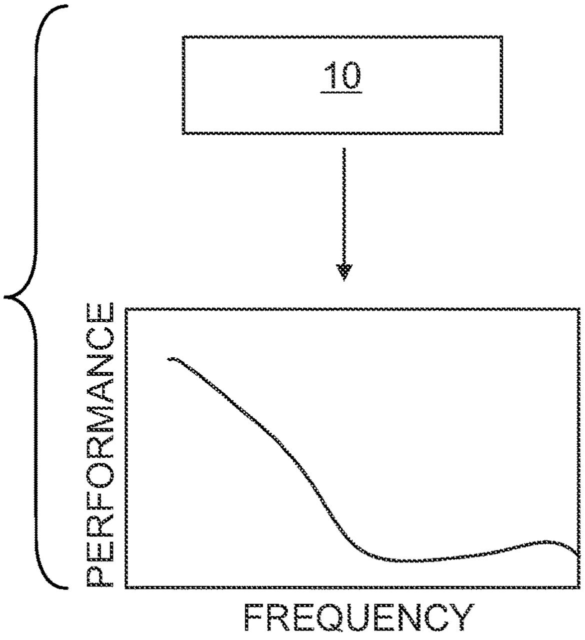
FIG. 1 is a schematic view of a first sample RFID device and an illustration of its performance in a range of frequencies.

In some embodiments, the performance of two differently configured RFID devices (or two similarly configured RFID devices associated to different pieces of merchandise/products or to the same type of merchandise/products in different locations) is tested over a range of frequencies. FIG. 1 illustrates a first sample RFID device 10 of a plurality of differently configured sample RFID devices (not shown), along with its performance over a range of frequencies. It should be understood that the exact criteria encompassed by the term "performance" may vary without departing from the scope of the present disclosure, but may include the sensitivity of the first sample RFID device 10. Similarly, the nature of the test or tests to which the first sample RFID device 10 is subjected to in order to determine its performance over a range of frequencies may vary, with the exact test or tests depending on the criteria of interest (i.e., the criteria used to define the "performance" of the first sample RFID device 10). If more than one test is performed on the first sample RFID device 10 over the range of frequencies, different weightage may be given to the results of at least two of the tests, depending on the relative importance of the different values being tested. The plurality of differently configured sample RFID devices including a first sample RFID device mentioned herein are RFID devices to be incorporated in the EAS system.

It should also be understood that the particular range of frequencies over which the performance of an RFID device is considered may vary without departing from the scope of the present disclosure. However, it may be advantageous for the range of frequencies to be the same range of frequencies or to include the operating frequency used in the EAS system into which the RFID device is to be incorporated. If possible, it may be advantageous for the performance of an RFID device to be considered in the exact EAS system into which it is to be incorporated. If not possible, it may be advantageous for the performance of an RFID device to be considered in an environment that mimics the EAS system into which it is to be incorporated.

Figure 2:
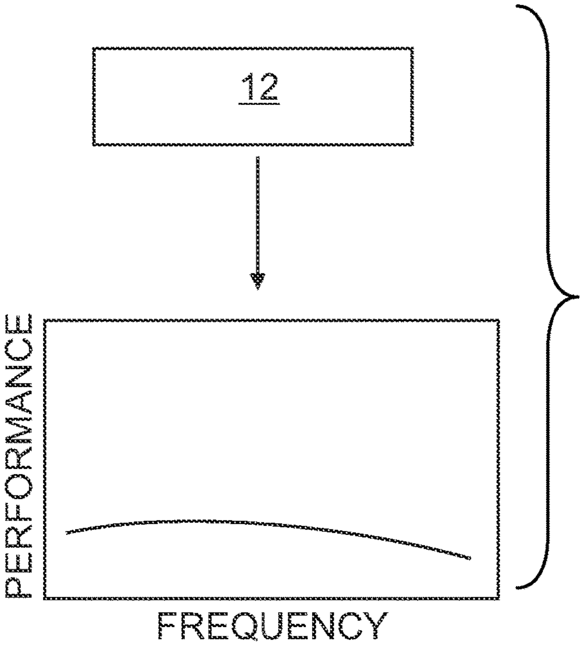
FIG. 2 is a schematic view of a second sample RFID device and an illustration of its performance in the same range of frequencies as in FIG. 1.

FIG. 2 illustrates a second sample RFID device 12 of the plurality of differently configured sample RFID devices (not shown), along with its performance over the same range of frequencies as in FIG. 1. The plurality of differently configured sample RFID devices are provided to be reconfigured or incorporated into the EAS system as it is in their original configuration, based on their overall performance in the EAS system. When all the sample RFID devices tagged to various products and monitored by the EAS system work the same, the EAS system becomes predictable, which helps in optimizing the system for allowing good detection at the detection zone, while preventing false alarms at the detection zone. Therefore, convergence of performance of the plurality of differently configured sample RFID devices configured to be disposed in the inventory zone becomes necessary. Controlling variability of the sample RFID devices in the inventory zone, by converging read range of all sample RFID devices in the inventory zone allows better control over the inventory zone and the detection zone of the EAS system.

In some embodiments, a plurality of target RFID devices are provided as the reference for comparing performance and for convergence. For example, performance of the plurality of differently configured sample RFID devices can be converged with performance of complementary target RFID devices corresponding to each of the plurality of differently configured sample RFID devices. As per an aspect of the invention, the target RFID devices are chosen such that convergence of performance of the sample RFID devices with the performance of the complementary target RFID devices results in overall convergence of performance of all the differently configured sample RFID devices. In one embodiment, the plurality of differently configured sample RFID devices tagged to different products and having different read ranges are reconfigured so that the plurality of differently configured sample RFID devices have the same read range over a range of frequencies, thereby resulting in convergence of performance. The convergence of performance is done to ensure that performance of all sample RFID devices is similar even when they are attached to different merchandise/products made of different materials. In one embodiment, the performance of the plurality of differently configured sample RFID devices can be converged with a single target RFID device. In another embodiment, the performance of one or more sample RFID devices of the plurality of differently configured sample RFID devices can be converged with performance of complementary target RFID devices. The performance configuration information corresponding to the plurality of target devices is stored in a digital database that can be accessed for completing the convergence of performance. The nature of merchandise/products to which the plurality of differently configured sample RFID devices are to be tagged is considered while determining the performance configuration information of the plurality of target RFID devices.

Typically, the configuration of the second sample RFID device 12 is different from the configuration of the first sample RFID device 10, which may include one or more of a difference in the configuration (including shape, size, and material composition) of its antenna; the configuration (including sensitivity, input capacitance, and identifier) of its RFID chip; the nature and configuration of associated non-functional components; the nature of the piece of merchandise/product to which it is associated; and the location at which it is connected to the associated piece of merchandise. It should be understood that the foregoing list is merely exemplary and that there may be other differences between the first sample RFID device 10 and second sample RFID device 12.

As can be seen by comparing FIGS. 1 and 2, the sample RFID device 10 and 12 perform differently over the same range of frequencies. Due to the differences in performance (and presuming that the range of frequencies is indicative of the operating frequency or range of frequencies employed in the EAS system into which the RFID devices 10 and 12 are to be incorporated), an EAS system incorporating both RFID devices 10 and 12 may require a relatively large transition zone to prevent false alarms.

Figure 3:
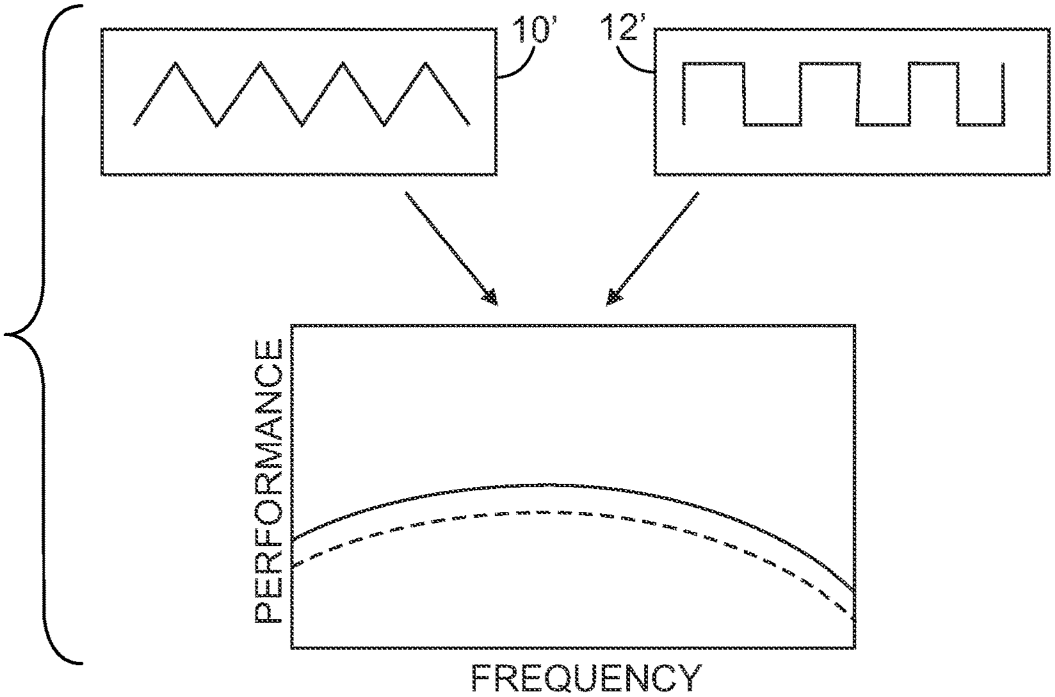
FIG. 3 is a schematic view of reconfigured versions of the sample RFID devices of FIGS. 1 and 2, along with an illustration of their performance in the same range of frequencies as in FIGS. 1 and 2.

In some embodiments, one or more of the plurality of differently configured sample RFID device can be reconfigured (digitally and/or physically as discussed above) to ensure that the transition zone of the EAS system in relatively smaller. For example, in the present embodiment, both of the first and second sample RFID devices 10 and 12 is reconfigured in order to converge (i.e., render more similar) their performance over the tested range of frequencies. FIG. 3 illustrates a reconfigured version 10' of the first sample RFID device 10, a reconfigured version 12' of the second sample RFID device 12, and a comparison of the performance of both reconfigured first and second sample RFID devices 10' and 12' over the same range of frequencies as in FIGS. 1 and 2, with a solid line representing the performance of the reconfigured first sample RFID device 10' and a broken line representing the performance of the reconfigured second sample RFID device 12'. As can be seen in FIG. 3, the performance of the two reconfigured first and second sample RFID devices 10' and 12' is not identical over the range of frequencies, but is very similar, and notably more similar than the performances shown in FIGS. 1 and 2. It can, thus, be said that the performance of the original first and second sample RFID devices 10 and 12 over the tested range of frequencies has been converged by reconfiguring them.

In some embodiments, reconfiguration for converging performance of the plurality of differently configured sample RFID devices can be performed by individually testing and comparing the sample RFID devices with one another, and modifying each of the sample RFID devices. In other embodiments, reconfiguration for converging performance of the plurality of differently configured sample RFID devices can involve testing followed by comparison with the complementary target RFID devices, and modifying each of the plurality of differently configured sample RFID devices based on the performance configuration of each of the complementary target RFID devices. The performance configuration of the plurality of target RFID devices is chosen in a manner such that after reconfiguration the performance of each sample RFID device of the plurality of differently configured sample RFID devices is similar even though they may be tagged to different merchandise/products.

In some embodiments, reconfiguration of the plurality of differently configured sample RFID devices involves digitally modifying one or more sample RFID devices with different performance configurations. Digital modifications include, but are not limited to, providing the one or more sample RFID devices with a unique digital indicator, linked to a digital database containing performance configuration information of a plurality of target RFID devices including that of the complementary target RFID devices corresponding to the one or more sample RFID devices. The plurality of differently configured sample RFID devices thus reconfigured are incorporated into EAS system. The EAS system further contains RFID readers configured to read the one or more sample RFID devices each containing the unique digital indicator, based on performance configuration information corresponding to the one or more RFID devices accessed from the digital database. This allows the EAS system including the RFID readers at the detection zone to digitally consider the behavior of all sample RFID devices disposed in the inventory zone, allowing the readers at the detection zone (gates) to sound an alarm if any product is being stolen. At the same time, it is ensured that there are no false alarms due to over reading.

In another embodiment, reconfiguration of the plurality of differently configured sample RFID devices involves making physical modifications to one or more sample RFID devices. For example, the particular physical modifications made to each sample RFID device 10, 12 may vary without departing from the scope of the present disclosure. In this example, the configuration of the antenna of one or both of the RFID devices 10 and 12 may be changed. This may include changing (either increasing or decreasing) the size of the antenna (which may include changing the surface area and/or thickness of the antenna), the shape of the antenna (including the shape of the outer perimeter of the antenna and the number, size, and/or configuration of any voids defined within the outer perimeter), and/or the material composition of at least a portion of the antenna (e.g., using a conductive ink instead of an aluminum foil or using different materials in different regions of the antenna instead of using the same material at all locations).

Other possible modifications include (but are not limited to) the nature and configuration of associated non-functional components such as a piece of merchandise to which the first sample RFID device is associated, and the location at which the first sample RFID device is connected to the associated piece of merchandise. For example, the available mounting space for the first sample RFID device may have areas adjacent to the space with different materials in them, such as metallic items, conductive fabrics, areas of a denser high dielectric constant material, etc. The performance of the first sample RFID device depends upon the its position with respect to these other materials in and adjacent to the mounting space, such that the position of the first sample RFID device with respect to these areas may be changed to modify the performance of the first sample RFID device, thus contributing to convergence of the first sample RFID device with the overall set of sample RFID devices to be used in the EAS system.

Reconfiguring a sample RFID device may also (or alternatively) include changing one or more characteristics of the RFID chip, such as its sensitivity, input capacitance, and an identifier of the RFID chip. While physical changes to the sample RFID device may require modifications to be made in a manufacturing facility, certain modifications to the RFID chip of the sample RFID device may be done at the testing site. For example, in one exemplary embodiment, the sample RFID device is tested by associating it to a piece of merchandise and placing into the inventory zone of the EAS system into which the sample RFID device is to be incorporated (if possible) or into an environment approximating such an EAS system. An RFID reader of the EAS system configured to detect sample RFID devices only in the detection zone is then activated while the store or environment is in a defined state (e.g., free of customers) and any sample RFID devices in the inventory zone tags that can be read are detected. The EAS system (or a system local to the inventory zone) can then send commands to the RFID chips of the detected sample RFID devices that can change selected parameters (e.g., chip sensitivity, input capacitance, and identifier) to eliminate the sample RFID device from being read by the RFID reader associated with the detection zone, thereby increasing convergence. In another exemplary embodiment, the sample RFID devices in the inventory space that can be read by the RFID reader of the detection zone are detected, but the same sample RFID devices are also detected by an RFID reader associated with the inventory zone (e.g., an overhead reader system) at the same time. Variations in the parameters of some or all of the RFID chips of the detected sample RFID devices are then made to maintain inventory performance but eliminate false alarm reads from the RFID reader associated with the detection zone of the EAS system.

For example, in FIG. 2, it will be seen that the performance of the second sample RFID device 12 is more similar to the performance of the reconfigured second sample RFID device 12' (FIG. 3) than the performance of the first sample RFID device 10 (FIG. 1) is to the performance of the reconfigured first sample RFID device 10' (FIG. 3). Thus, it may be the case that more (and/or more significant) modifications are required to reconfigure the first sample RFID device 10 than to reconfigure the second sample RFID device 12. Depending on the relative performances of two sample RFID devices over a range of frequencies, it may be possible to reconfigure only one of the sample RFID devices to mimic or approximate the performance of the other sample RFID device. However, it may frequently be the case that, due to any of a variety of restrictions on the configuration of a sample RFID device, that both sample RFID devices must be reconfigured, at least slightly. For example, the maximum surface area of the antenna of a sample RFID device may be limited, such that some other aspect of the RFID must be changed if it would be otherwise desirable to increase the surface area of the antenna beyond the maximum size. If there is not some other aspect of the sample RFID device that can be changed to compensate for the limit on the size of the surface area of the antenna (e.g., due to it being impermissible to change the material composition and/or thickness of the antenna), it may be necessary for some aspect of the other sample RFID device to be changed instead to converge the performances of the sample RFID devices.

The point at which the performance of two differently configured sample RFID devices is deemed to be sufficiently similar so as to render them suitable for use in the same EAS system may vary without departing from the scope of the present disclosure. A higher degree of similarity may be required if a smaller transition zone is desired, while a lesser degree of similarity may be acceptable if the transition zone may be larger. Other factors (e.g., the nature of the RFID reader(s) employed in the EAS system and the importance of avoiding false alarms) may also be considered in determining the necessary degree of similarity between the performances of two differently configured sample RFID devices over a range of frequencies. It may be the case that a single redesign of the sample RFID devices may not be sufficient, but that multiple iterations of testing the reconfigured sample RFID devices and then reconfiguring one or more of them may be required before their performances are deemed to have converged.

In some embodiments, differently configured sample RFID devices to be incorporated into a common EAS system may be manufactured from the same initial sample RFID device template. The template may have an initial configuration that is different from at least one of (if not all of) the final configurations, e.g. a first final configuration of the sample RFID devices to be incorporated into the EAS system. Preferably, the template has a configuration allowing for it to be built in large volume at low cost, possibly with a configuration that is sufficiently simple or basic to allow it to be reconfigured for different RFID devices used in not only one EAS system, but for differently configured sample RFID devices to be used in a plurality of different EAS system. Depending on the desired final configuration, the template can be modified by any approach, which may include methods such a cutting to change the overall shape of the antenna, laser modification of the conductors or addition of over-printed materials (e.g., as conductors, resistive materials, dielectrics, and magnetic materials) to change performance, and so on to create a set of differently configured sample RFID devices having a second final configuration with converging performance over a range of frequencies for a particular EAS system and product mix. For example, in one embodiment, at least one of the first and second final configurations includes an over-printed resistive material that is not included in the initial configuration of the sample RFID device template. In another embodiment, wherein at least one of the first and second final configurations includes an over-printed dielectric material that is not included in the initial configuration. In one more embodiment, at least one of the first and second final configurations includes an over-printed conductive material that is not included in the initial configuration. In yet another embodiment, at least one of the first and second final configurations includes an over-printed magnetic material that is not included in the initial configuration.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A method of configuring radio frequency identification (RFID) devices for use in an electronic article surveillance (EAS) system, the method comprising:
- providing a plurality of differently configured sample RFID devices attached to different products monitored by the EAS system;
- testing performance of the plurality of differently configured sample RFID devices in a range of frequencies;
- comparing the performance of the plurality of differently configured sample RFID devices in the range of frequencies with performance of complementary target RFID devices in the range of frequencies;
- reconfiguring one or more of the plurality of differently configured sample RFID devices to converge the performance of the one or more sample RFID devices in the range of frequencies with that of the performance of the complementary target RFID devices in the range of frequencies when the performance of the one or more sample RFID devices in the range of frequencies diverges from that of the performance of the complementary target RFID devices in the range of frequencies; and
- incorporating the one or more sample RFID devices into the EAS system when the performance of the one or more sample RFID devices after reconfiguration aligns with the performance of the complementary target RFID devices or with performance of each other in the range of frequencies.

2. The method of claim 1, wherein reconfiguring the one or more sample RFID devices involves digitally modifying the one or more sample RFID devices.

3. The method of claim 2, wherein the digital modifications to the one or more sample RFID devices comprises providing each of the one or more RFID devices with a unique digital indicator, linked to a digital database containing performance configuration information of a plurality of target RFID devices including that of the complementary target RFID devices corresponding to the one or more RFID devices.

4. The method of claim 3, wherein the unique digital indicator applied to the one or more RFID devices is same when the one or more sample RFID devices are tagged to set of products of same type.

5. The method of claim 3, wherein the performance configuration information of the plurality of target RFID devices including the performance of the complementary target RFID devices is determined based on the type of products to which the corresponding plurality of sample RFID devices are tagged.

6. The method of claim 1, wherein said reconfiguring the one or more sample RFID devices involves making physical modifications to the one or more sample RFID devices.

7. The method of claim 6, wherein the reconfiguring the one or more sample RFID devices involving physical modifications to converge the performance of the one or more sample RFID devices in said range of frequencies comprises changing the configuration of an antenna of at least one of the one or more sample RFID devices.

8. The method of claim 6, wherein the reconfiguring the one or more sample RFID devices involving physical modifications to converge the performance of the one or more sample RFID devices in the range of frequencies comprises changing the size of an antenna of at least one of the one or more sample RFID devices.

9. The method of claim 7, wherein the reconfiguring the one or more sample RFID devices involving physical modifications to converge the performance of first and second RFID devices in the range of frequencies comprises changing the shape of hg antenna of at least one of the one or more sample RFID devices.

10. The method of claim 7, wherein the reconfiguring the one or more sample RFID devices involving physical modification to converge the performance of the one or more sample RFID devices in the range of frequencies by changing the configuration of the antenna comprises changing the material composition of the antenna of at least one of the one or more sample RFID devices.

11. The method of claim 7, wherein the reconfiguring the one or more sample RFID devices involving physical modifications to converge the performance of the one or more sample RFID devices in the range of frequencies comprises changing the configuration of an RFID chip of at least one of the one or more sample RFID devices.

12. The method of claim 11, wherein the changing the configuration of the RFID chip comprises changing the sensitivity of the RFID chip of at least one of the one or more sample RFID devices.

13. The method of claim 11, wherein the changing the configuration of the RFID chip comprises changing the input capacitance of the RFID chip of at least one of the one or more sample RFID devices.

14. The method of claim 11, wherein said changing the configuration of the RFID chip comprises changing an identifier of the RFID chip of at least one of the one or more sample RFID devices.

15. The method of claim 1, wherein the reconfiguring the one or more sample RFID devices to converge the performance of the one or more RFID devices with that of the performance of the complementary target RFID devices or with each other in the range of frequencies comprises changing the configuration of at least one non-functional component of at least one of the one or more sample RFID devices.

16. The method of claim 3, wherein the EAS system comprises RFID readers configured to read the one or more sample RFID devices each comprising the unique digital indicator based on performance configuration information corresponding to the one or more RFID devices accessed from the digital database.

17. The method of claim 16, wherein the performance of the one or more sample RFID devices in the range of frequencies is tested using the EAS system.

18. The method of claim 17, wherein the range of frequencies is based at least in part on a frequency or frequencies employed in the EAS system.

19. A method of manufacturing radio frequency identification (RFID) devices for use in an electronic article surveillance (EAS) system, the method comprising:
providing a plurality of sample RFID devices having an identical initial configuration;
reconfiguring one of said plurality of sample RFID devices to have a first final configuration;
reconfiguring another one of said plurality of sample RFID devices to have a second final configuration; and
incorporating the sample RFID devices having the first and second final configurations into the EAS system, wherein
the first final configuration is different from the second final configuration; and
the sample RFID devices having the first and second final configurations have converging performance at a frequency or in a range of frequencies employed in the EAS system.

20. The method of claim 19, wherein at least one of the first and second final configurations of the sample RFID devices has a differently sized antenna than an antenna of initial configuration.

21. The method of claim 19, wherein at least one of the first and second final configurations of the sample RFID devices has a differently shaped antenna than an antenna of the initial configuration.

22. The method of claim 19, wherein at least one of the first and second final configurations includes an over-printed resistive material that is not included in the initial configuration.

23. The method of claim 19, wherein at least one of the first and second final configurations includes an over-printed dielectric material that is not included in the initial configuration.

24. The method of claim 19, wherein at least one of the first and second final configurations includes an over-printed conductive material that is not included in the initial configuration.

25. The method of claim 19, wherein at least one of the first and second final configurations includes an over-printed magnetic material that is not included in the initial configuration.

* * * * *